United States Patent
Hurtta et al.

(10) Patent No.: US 7,277,706 B2
(45) Date of Patent: Oct. 2, 2007

(54) PROVISION OF SERVICE CONTEXTS IN A COMMUNICATION SYSTEM

(75) Inventors: Tuija Hurtta, Espoo (FI); Seppo Vehmer, Vantaa (FI)

(73) Assignee: Nokia Corporation, Espoo (FI)

( * ) Notice: Subject to any disclaimer, the term of this patent is extended or adjusted under 35 U.S.C. 154(b) by 261 days.

(21) Appl. No.: 10/756,337

(22) Filed: Jan. 14, 2004

(65) Prior Publication Data

US 2004/0157603 A1    Aug. 12, 2004

Related U.S. Application Data (60) Provisional application No. 60/446,545, filed on Feb. 12, 2003.

(51) Int. Cl.
*H04Q 7/20* (2006.01)

(52) U.S. Cl. .................... 455/435.1; 455/434

(58) Field of Classification Search ........... 455/435.1, 455/434, 414.3, 414.4, 433, 436, 453; 725/62, 725/118

See application file for complete search history.

(56) References Cited

U.S. PATENT DOCUMENTS

| | | | |
|---|---|---|---|
| 5,519,706 A * | 5/1996 | Bantz et al. ............. | 455/435.2 |
| 5,852,655 A * | 12/1998 | McHale et al. .......... | 379/93.14 |
| 6,795,419 B2 * | 9/2004 | Parantainen et al. ........ | 370/337 |
| 2004/0073928 A1 * | 4/2004 | Alakoski et al. .............. | 725/62 |
| 2004/0137885 A1 * | 7/2004 | Sarkkinen et al. ........ | 455/414.1 |

* cited by examiner

*Primary Examiner*—Melur Ramakrishnaiah
(74) *Attorney, Agent, or Firm*—Squire, Sanders & Dempsey, L.L.P.

(57) ABSTRACT

A method in a communication system comprises a core network, at least one access network and a plurality of user equipment configured to join a service context. In the method information is collected at a core network entity regarding user equipment that joins the service context. The core network entity may then transport to an access network entity a message containing information regarding a plurality of user equipment that has joined the service context.

16 Claims, 4 Drawing Sheets

PROVISION OF SERVICE CONTEXTS IN A COMMUNICATION SYSTEM

CROSS-REFERENCE TO RELATED APPLICATIONS

This application claims priority of U.S. Provisional Patent Application Ser. No. 60/446,545, entitled, "Provision of Service Contexts in a Communication System," filed Feb. 12, 2003, the entire contents of which are incorporated herein by reference.

BACKGROUND OF THE INVENTION

1. Field of the Invention

The present invention relates to provision of service context in a communication system, and in particular, but not exclusively, to provision of multimedia service contexts in a mobile communication system.

2. Description of the Related Art

A communication system is a facility that enables communication between two or more entities such as user terminal equipment and/or networks entities and other nodes associated with the communication system. The communication may comprise, for example, communication of voice, electronic mail (email), text messages, data, multimedia and so on.

The communication may be provided via fixed line and/or wireless communication interfaces. A feature of the wireless communication systems is that they provide mobility for the users thereof. Examples of communication systems providing wireless communication include the public land mobile network (PLMN) and wireless data networks such a the Wireless Local Area Network (WLAN).

A type of the PLMN is a cellular communication system. In a cellular system the user equipment may access the communication network via access entities known as radio access networks. The skilled person knows the basic operational principles and elements of a cellular network and these are therefore not explained herein in any greater detail. It is sufficient to note that a cell can be defined as an radio access entity that is served by one or several base stations (BS) serving user equipment (UE) via a wireless interface between the base station and the user equipment. Examples of the cellular networks include networks that are based on access systems such as the CDMA (Code Division Multiple Access), WCDMA (Wide-band CDMA), TDMA (Time Division Multiple Access), FDMA (Frequency Division Multiple Access), or SDMA (Space Division Multiple Access) and hybrids thereof.

A communication system typically operates in accordance with a given standard or specification which sets out what the various elements of the system are permitted to do and how that should be achieved. For example, the standard or specification may define if the user, or more precisely, user equipment is provided with a circuit switched service or a packet switched service or both. Communication protocols and/or parameters which shall be used for the connection are also typically defined. For example, the manner how communication shall be implemented between the user equipment and the elements of the communication network is typically based on a predefined communication protocol. In other words, a specific set of "rules" on which the communication can be based on needs to be defined to enable the user equipment to communicate via the communication system.

Standardization of the so called multicast/broadcast multimedia service (MBMS) has been started by the third Generation Partnership Project (3GPP). Multimedia Broadcast/Multicast Service (MBMS) is at present specified in the 3GPP release 6 (R6). More specific details of the MBMS may be found, for example, in the 3GPP technical specification TS22.146 or 3GPP TS25.346 'Introduction of the Multimedia Broadcast Multicast Service (MBMS) in the Radio Access Network'.

The latter is a standard associated with the provision of multimedia services in mobile communication systems. Such broadcasts may be provided on a point-to-multipoint channel, i.e. a shared channel from the network to multiple user equipment, or on a point-to-point channel, i.e. on a dedicated channel from the network to each user equipment.

In order to get common understanding of the principles to define the multicast/broadcast multimedia service (MBMS) architecture and the procedures, some basic assumptions have been made this far. In accordance with the present thinking a controlling radio network controller (CRNC) such as a radio network controller (RNC) controlling one or more cells is assumed to maintain one MBMS context per established multicast/broadcast multimedia service (MBMS). This is applied for each CRNC within a MBMS serving area. Each controlling radio network controller (CRNC) multicast/broadcast multimedia service (MBMS) context (CRNC MBMS context) is thus associated with a single MBMS service ID. The CRNC MBMS context can be associated with a list of user equipment (UE) in connected mode. The list includes those user equipment (UEs) that are present in each cell controlled by the CRNC and have activated a MBMS service. In addition, the CRNC MBMS context can be established when the radio access bearer (RAB) for the MBMS is established between the radio network controller (RNC) and the serving GPRS support node (SGSN; General Packet Radio Network) for a specific multicast/broadcast multimedia service (MBMS). It is also assumed that only one information flow over the Iu-interface between a radio network controller and the core network is provided for the radio network controller (RNC) per established multicast/broadcast multimedia service (MBMS). Thus, each user equipment (UE) in connected mode with an activated multicast/broadcast multimedia service (MBMS) has its user equipment (UE) context bind to the radio access bearer (RAB) for this multicast/broadcast multimedia service (MBMS).

The current MBMS proposal assumes that that two different types of MBMS contexts will be possible in the MBMS. These proposed context types are MBMS service specific "MBMS service context" and user equipment (UE) specific "MBMS UE context".

It is not necessary for the user equipment to join any of the MBMS broadcast services in order to receive them. However, each user equipment has to join the MBMS service in order to receive multicast. In a typical case the "joining" shall be understood such that before the reception of the MBMS session the user equipment must go through the so called "Join" procedure, upon which the user equipment indicates its willingness to receive the MBMS service session. This phase is typically performed by using the point-to-point connection and therefore it is secured. This allows sending of session specific parameters in secure form. The following will relate to service contexts that require the user equipment to join them.

It has been agreed in the 3GPP that the user equipment (UE) may join an MBMS service by sending an IGMP 'Join' message to the Gateway General Packet Radio Service (GPRS) Support Node (GGSN). IGMP (Internet Group Management Protocol) is a well known protocol defined by the Internet Engineering Task Force (IETF). The UE also signals with the Serving GPRS Support Node (SGSN) to activate an MBMS UE context. When the user equipment joins the service, the above referenced MBMS service contexts and MBMS UE contexts are created in the appropriate GGSN/SGSN entities.

It has been proposed that a Radio Access Network Application Part (RANAP) signaling message is sent from the SGSN to the RNC per each joined Packet Mobility Management connected (PMM-CONNECTED) user equipment. However, the Inventors have found that this may create substantial amount of signaling, especially if the services prove to be hugely popular among the mobile users.

The UE may also leave the MBMS service it has joined earlier. However there are no common rules for the procedure to leave. A proposal is that the MBMS UE context is removed all together at the time of a user equipment leaving the service. Another proposal is that the MBMS service context could be removed when the MBMS data transmission is over. The removal can be accomplished in response to a notification from a multimedia service content provider entity such as Broadcast/Multicast Service Center (BM-SC) that the MBMS service is over.

However, such inflexible removal of the MBMS contexts may cause problems. For example, if a new user equipment joins the MBMS service context during a MBMS data transmission from which the MBMS service context has been removed, the MBMS service context has to be created again in appropriate GGSN/SGSN entities. This may result in unnecessary signaling at MBMS service context removal and re-creation operations.

Furthermore, if all joined user equipment are leaving the service substantially at the same time when a new user equipment wants to join, the MBMS service context may become removed despite the new willing user.

The network entities involved in the service provisioning need to be informed about any new user equipment and/or any removed user equipment. Information regarding changes in the status of user equipment may also need to be passed between the entities of the core and radio access networks. This may cause a substantial amount of signaling between the radio access network and the core network that is caused by reports regarding changes in the service status or other information of individual user equipment.

SUMMARY OF THE INVENTION

According to one embodiment, there is provided a method in a communication system that comprises a core network and at least one access network and wherein a plurality of user equipment is enabled to join a service context. In the method information is collected at a core network entity regarding user equipment that join the service context. The core network entity may then transport to an access network entity a message containing information regarding a plurality of user equipment that have joined the service context.

According to another embodiment there is provided a method in a communication system wherein a plurality of user equipment is enabled to join a service context of a service. In the method information regarding user equipment that have joined the service context is stored in a memory of at least one network entity. Information may then be removed from the memory, the information to be removed may be associated with the user equipment or the service context. The removal is accomplished only after a predefined period of inactivity in the use of the service.

In a more particular form the RAN is informed about a plurality of joined user equipment and/or any changes in the status of the joined user equipment in one RANAP signaling message. The RANAP message may contain also other information, such as an MBMS service identifier (e.g. an IP multicast address) and Quality of Service (QoS) attributes.

Initiation of MBMS service context removal from the GGSN may occur in response to detecting that the MBMS service context has been inactive for a predefined period of time.

The embodiments of the invention may reduce the amount of signaling when compared to solutions wherein each event needs to be reported. The embodiments may also be used to ensure that the MBMS contexts are not removed "too early".

BRIEF DESCRIPTION OF THE DRAWINGS

For better understanding of the present invention, reference will now be made by way of example to the accompanying drawings in which.

DETAILED DESCRIPTION OF THE PREFERRED EMBODIMENTS

The following describes in more detail mechanisms for handling MBMS service contexts and MBMS UE contexts in various occasions in core network nodes such as the SGSN and the GGSN and in the radio access network nodes such as the RNC. Possible mechanisms for communication between the SGSN and RAN will also be discussed.

Figure 1:
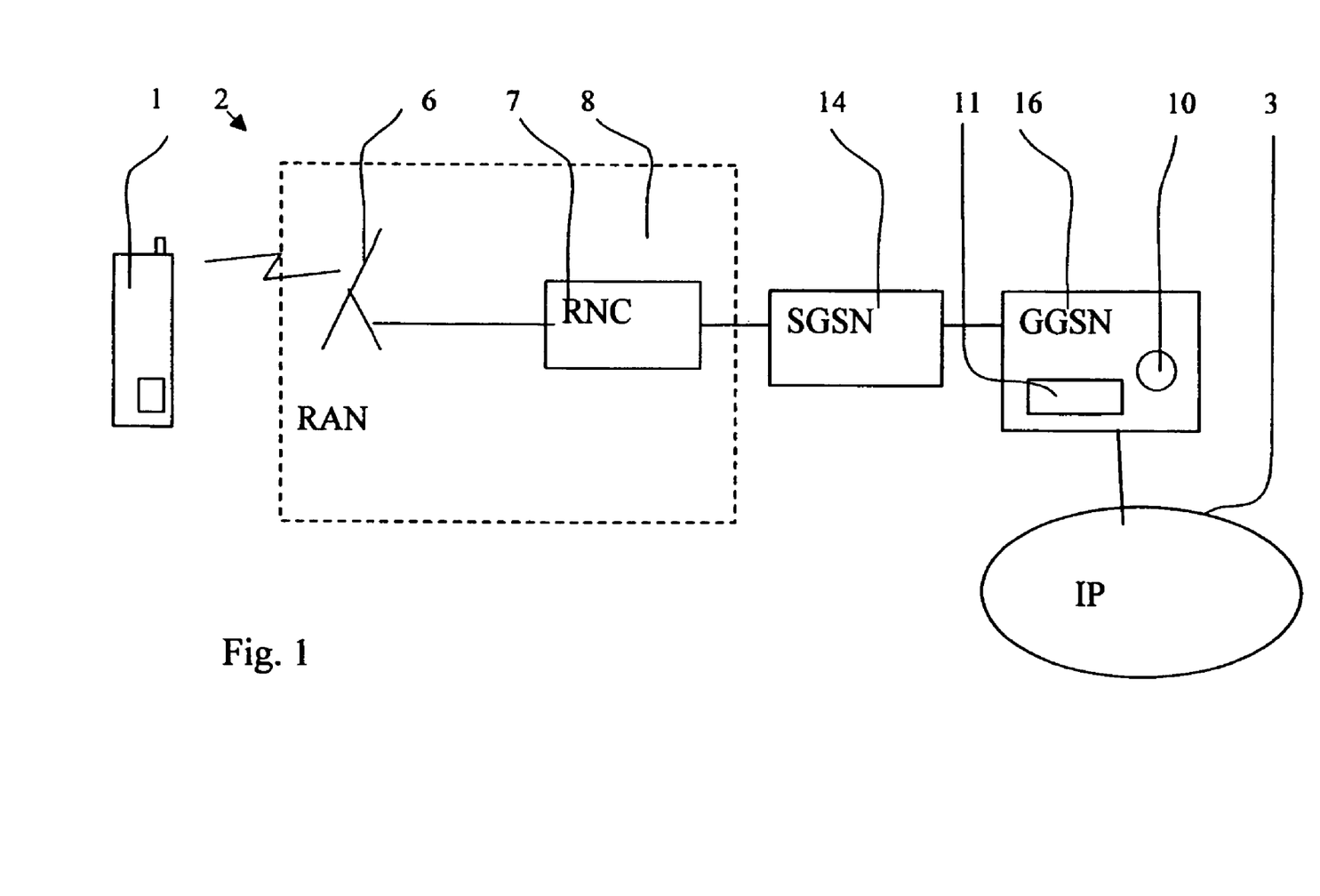
FIG. 1 shows a communication system wherein the present invention may be embodied.

In this regard reference is first made to FIG. 1 which shows a communication network wherein the present invention may be employed. The shown communication system is capable of providing wireless data transportation services for a user equipment 1 by means of a public land mobile network (PLMN) 2.

The skilled person is familiar with the features and operation of a typical mobile user equipment. Thus these do not need any further explanation. It is sufficient to note that the user may use the mobile user equipment 1 for performing tasks such as for making and receiving phone calls, for receiving content from the network and for experiencing the content presented by means of the display and/or the speaker and for interactive correspondence with another party. The user equipment 1 wanting to join a service context may be provided with appropriate means such as data processing means, memory means, an antenna for wirelessly receiving and transmitting signals from and to base stations, a display for displaying images and other visual information for the user of the mobile user equipment, speaker means, control buttons and so on. However, it shall be appreciated that the user equipment or the various elements of a user equipment as such do not form an essential feature of the present invention.

The elements of the PLMN network 2 will also be discussed briefly first to clarify the operation of a typical PLMN. A mobile station or other appropriate user equipment 1 is arranged to communicate via the air interface with a transceiver element 6 of the radio access network 8 of the PLMN. It should be appreciated that the term mobile station is intended to cover any suitable type of wireless user equipment, such as mobile telephones, portable data processing devices or portable web browsers.

The transceiver element 6 will be referenced to by the term base station. The term base station will be used in this document to encompass all elements which transmit to and/or receive from wireless stations or the like via the air interface. The base station 6 is controlled by a radio network controller RNC 7.

The radio network controller RNC and the base station belong to the radio access network RAN 8 (e.g. a UTRAN: UMTS Terrestrial RAN). It should be appreciated that a UMTS radio access network is typically provided with more than one RNC, and that each radio network controller is arranged generally to control more than one base station 6 although only one base station is shown in FIG. 1.

The radio access network 8 is connected to the core network of the PLMN system. Typically the connection would be provided to a SGSN (serving GPRS support node) 14 on an Iu interface. The SGSN 14 is for functions such as keeping track of the mobile station's location and performing security functions and access control. The SGSN 14 is connected to a GGSN (gateway GPRS support node) 16. The GGSN 16 provides interworking with other communication networks 3. In other words, the GGSN 16 acts as a gateway between the PLMN network 2 and the other networks.

FIG. 1 shows a data network, and more particularly, an IP based data network 3 as an example of such other network. However, it should be appreciated that embodiments of the invention may be applied to other types of communication arrangements as well. Therefore, although not shown, the communication system 2 of FIG. 1 may also be connected to conventional telecommunication networks, such as to a GSM based cellular public land mobile network (PLMN) or to a public switched telephone network (PSTN). The various networks may be interconnected to each other via appropriate interfaces and/or gateways.

Before explaining in more detail the operation in accordance with the preferred embodiments, a brief description is given regarding the service activation and joining procedures.

When joining a specific MBMS multicast service the user equipment needs to be registered in appropriate network entities to enable the reception of data from the service. The joining/activation is basically a signaling procedure between the user equipment and the network for establishing appropriate communication means within the network between the SGSN 14 and a content provision entity for distribution of MBMS data. The content provision entity may be e.g. a server connected to the IP network 3.

Another proposal for the 3GPP is that, when joining occurs, signaling also from the SGSN to the RNC occurs to inform the RNC about the joined user equipment. But even this signaling would not create the bearer between the SGSN and RNC (i.e. MBMS RAB).

The procedure establishes the user equipment contexts in the user equipment 1, SGSN 14 and GGSN 16 for each activated MBMS multicast service. The activation procedure also establishes MBMS service specific MBMS service contexts in the SGSN 14 and GGSN 16.

In accordance with a possible procedure the user equipment 1 initiates the joining by sending within an established point-to-point Packet data protocol (PDP) context an IGMP 'Join' request. The GGSN 16 receives the request and sends an MBMS notification request to the SGSN 14. The SGSN 14 requests the user equipment 1 to activate an MBMS UE context. The user equipment may then create an MBMS UE context and send an 'Activate MBMS Context' Request to the SGSN 14. An IP multicast address can be used to identify the desired MBMS multicast service. Address information such as an Access Point Name (APN) may be used as an indication of the correct GGSN 16.

Security functions may need to be performed, e.g. to authenticate the user equipment. Functions such as a subscription check for the requested MBMS multicast service may also be required.

The SGSN 14 may then create the user equipment specific MBMS UE context and send a 'Create MBMS Context' Request to the GGSN 16.

In certain occasions the requesting user equipment may be the first user equipment willing to join the MBMS multicast service on the GGSN, thus in practice activating it. In such case a possible, although not the only, procedure is such that the GGSN may join the service for the requested multicast IP address on the IP backbone 3 to connect with the content provider entity. The GGSN may then create an MBMS service context for the specific MBMS service and an MBMS UE context for the user equipment, add the user equipment to MBMS service context of that MBMS service and send 'Create MBMS Context Response' to the SGSN.

It is also possible that the requester is the first user equipment willing to join the MBMS multicast service on the SGSN 14. In such case the SGSN sends 'Create Context Request' to the GGSN 16 to setup the MBMS channels for MBMS data distribution. The SGSN then creates an MBMS service context for the specific MBMS service. The GGSN 16 may confirm the MBMS channel setup by sending 'Create Context Response' to the SGSN 14. The SGSN may then add the user equipment to its MBMS service context and send an 'Activate MBMS Context Accept' message to the user equipment 1.

Thus the core network elements 14 and/or 16 need to store information about mobile user equipment joining/leaving an MBMS service. In FIG. 1 the required information of the service context and the user equipment joined is stored in memory 11 of the GGSN 16. However, it shall be appreciated that in certain implementations the information may be stored either alternatively or also in a memory of the SGSN 14 (not shown for clarity). Nevertheless, in the present invention the information about mobile user equipment joining/leaving an MBMS service needs to be stored in the memory of at least one core network entity.

For each activated MBMS service context, the network elements are supposed to store an "MBMS service context". This information may include parameters that relate to the type of the PDP (=MBMS service context), the MBMS service ID (e.g. IP multicast address), Quality of Service (QoS) attributes, access point name (APN), GTP tunneling such as the receiving IP address and TEID both for signaling and data, the joined user equipment, charging, and so on.

For each joined user equipment, the core network elements are supposed to store an "MBMS UE context". This typically includes information relating to functions such as identification, authentication, security and mobility management. Information regarding the PDP type (=MBMS UE context), IMSI, MSISDN, MBMS service id (e.g. IP multicast address, APN, charging attributes and so on may also be stored. With the network elements of FIG. 1, the MBMS UE context can be stored in the SGSN and GGSN.

The RNC 7, in turn, needs to store at least an "MBMS service context" for each active MBMS service. However, whether RNC needs to store an "MBMS UE context" for each joined user equipment (UE) or not depends on the application.

Figure 2:
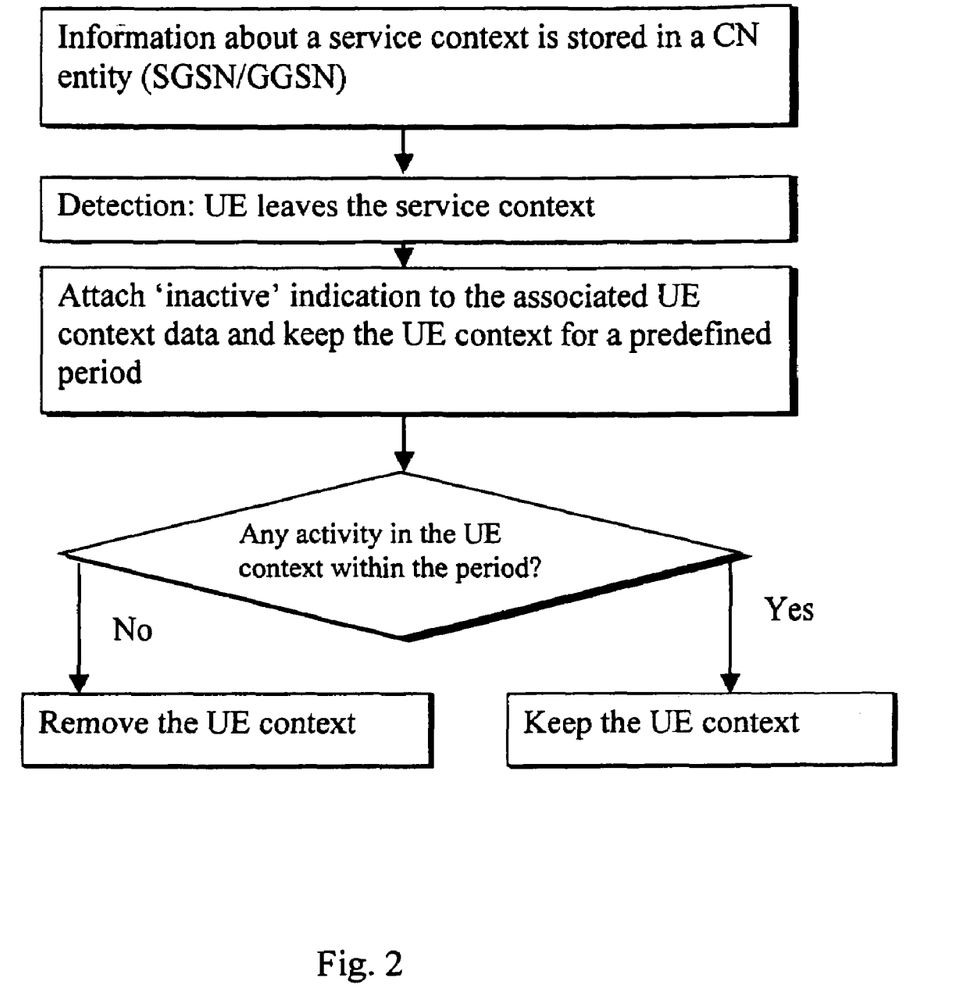
FIG. 2 is a flowchart for an embodiment.

An embodiment will now be described with reference also to FIG. 2. When a user equipment leaves the service, the MBMS UE context is kept for a predefined period instead of immediately removing it. An 'inactive' indication is preferably included in the MBMS UE context data stored in the appropriate core network entity.

The length of the storage period for the inactive UE context may be defined e.g. by the network operator or the system supplier. The length may be based on estimates of possibilities for need of the MBMS UE context.

Figure 3:
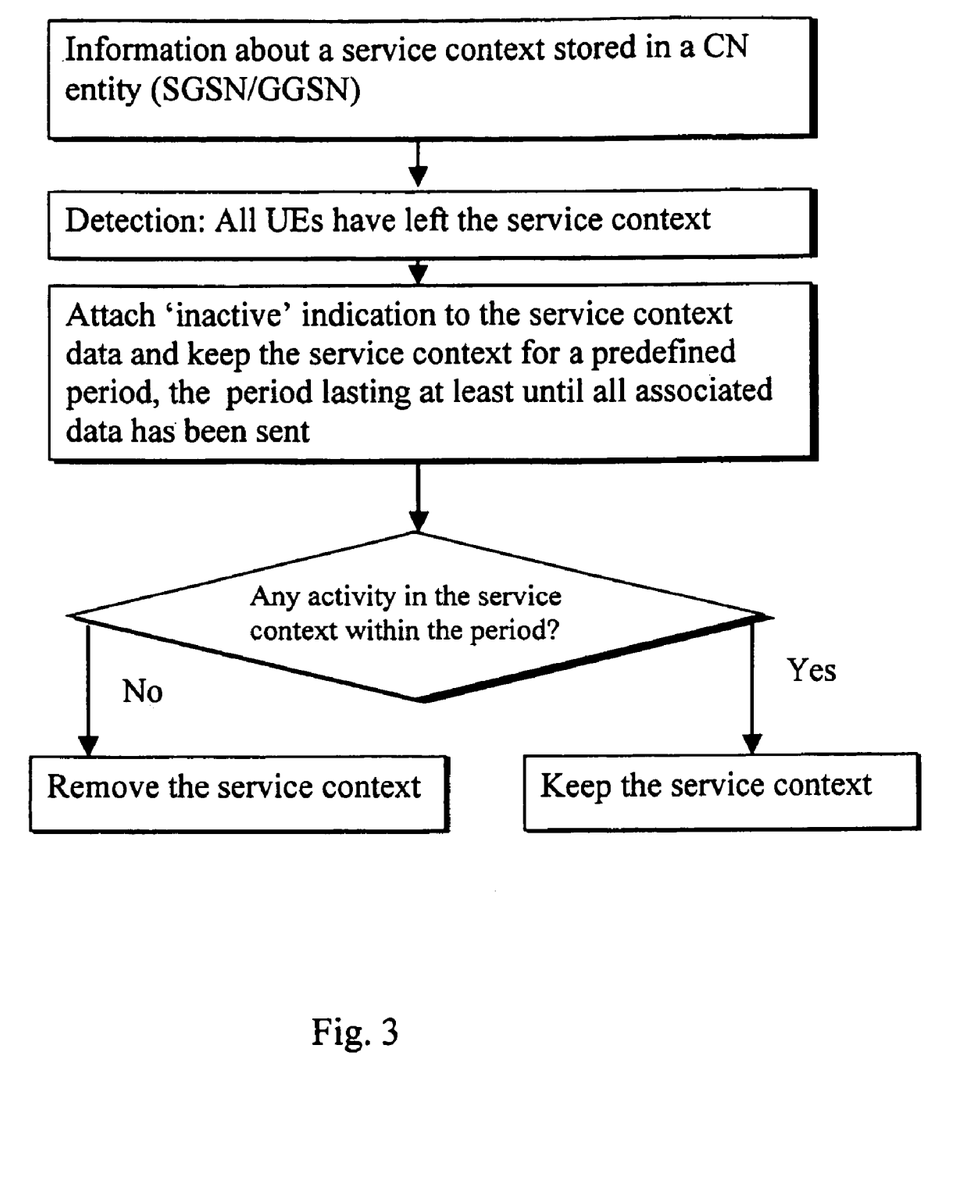
FIG. 3 is a flowchart for another embodiment.

FIG. 3 shows the operation in situation wherein all UEs have left the MBMS service. In this case the removal of the MBMS service context can be delayed such that the context is kept until the end of a predefined period. The MBMS service context is preferably kept at least as long as the MBMS data transmission is ongoing. This provides advantage in occasions where all user equipment have left the MBMS service and a new UE joins the service during the remaining MBMS data transmission. An 'inactive' indication may be added also to the MBMS service context by the core network entity storing the data associated with the MBMS service context.

The point from which the predefined time is counted for a MBMS UE context, e.g. when a timer 10 is started, may be triggered by detection that a user equipment has left the MBMS service.

The point from which the predefined time is counted for an MBMS service context, e.g. when a timer 10 is started, may be triggered by detection that all user equipments have left the MBMS service.

In the preferred form the MBMS service context removal is initiated by the GGSN when the GGSN notices that the MBMS service context has been inactive for a predefined period. Both GGSN and SGSN are capable of can detecting inactivity for the MBMS service context e.g. by detecting that no data is carried on the MBMS service context. The preferred solution is to implement the detection in the GGSN. The GGSN may monitor the status of the context continuously or periodically.

Alternatively, or in addition, the MBMS service context removal can be initiated by the SGSN when the SGSN notices that the MBMS service context has been inactive for a predefined period. The SGSN may thus also be provided with means for monitoring the status of the context.

Upon detection that the MBMS service context is inactive, the GGSN 16 initiates the MBMS service context removal from the SGSN 14 by sending an appropriate indication of the removal to the SGSN 14.

Indication of the inactivity of an MBMS UE context may come from the user equipment itself, e.g. if the user logs off. Notification regarding leaving of a user equipment may also be detected by another network node that the GGSN. For example, the radio network controller 7 serving the user equipment 1 or the SGSN 14 may detect that the user equipment 1 has left the MBMS service. A presence server may also be employed for the provision of notifications of such events.

Similar operation may follow a user equipment detach. i.e., it is possible to keep the MBMS UE context in the appropriate core network entity (e.g. the SGSN 14 and/or GGSN 16) for a predefined time period. The MBMS UE context data is stored in the memory thereof preferably with an 'inactive' indication. This way, the UE does not have to perform joining again for the same MBMS service when attaching the network. At attach, the MBMS UE context can be marked as 'active' in the SGSN and/or GGSN. This type of operation may reduce signaling between the user equipment and the network.

The MBMS service context may need to be removed from the core network entities involved in the provisioning of the service context when the MBMS data transmission is over. In FIG. 1 this would mean removal of the service context from the SGSN 14 and GGSN 16.

With this solution, no indication from the content provision entity such as the BM-SC is necessary. However, it shall be appreciated that the removal may also be initiated based on a notification from the content provider.

If the MBMS service context is removed, it is possible to automatically remove all related MBMS UE contexts, should those still exist.

Figure 4:
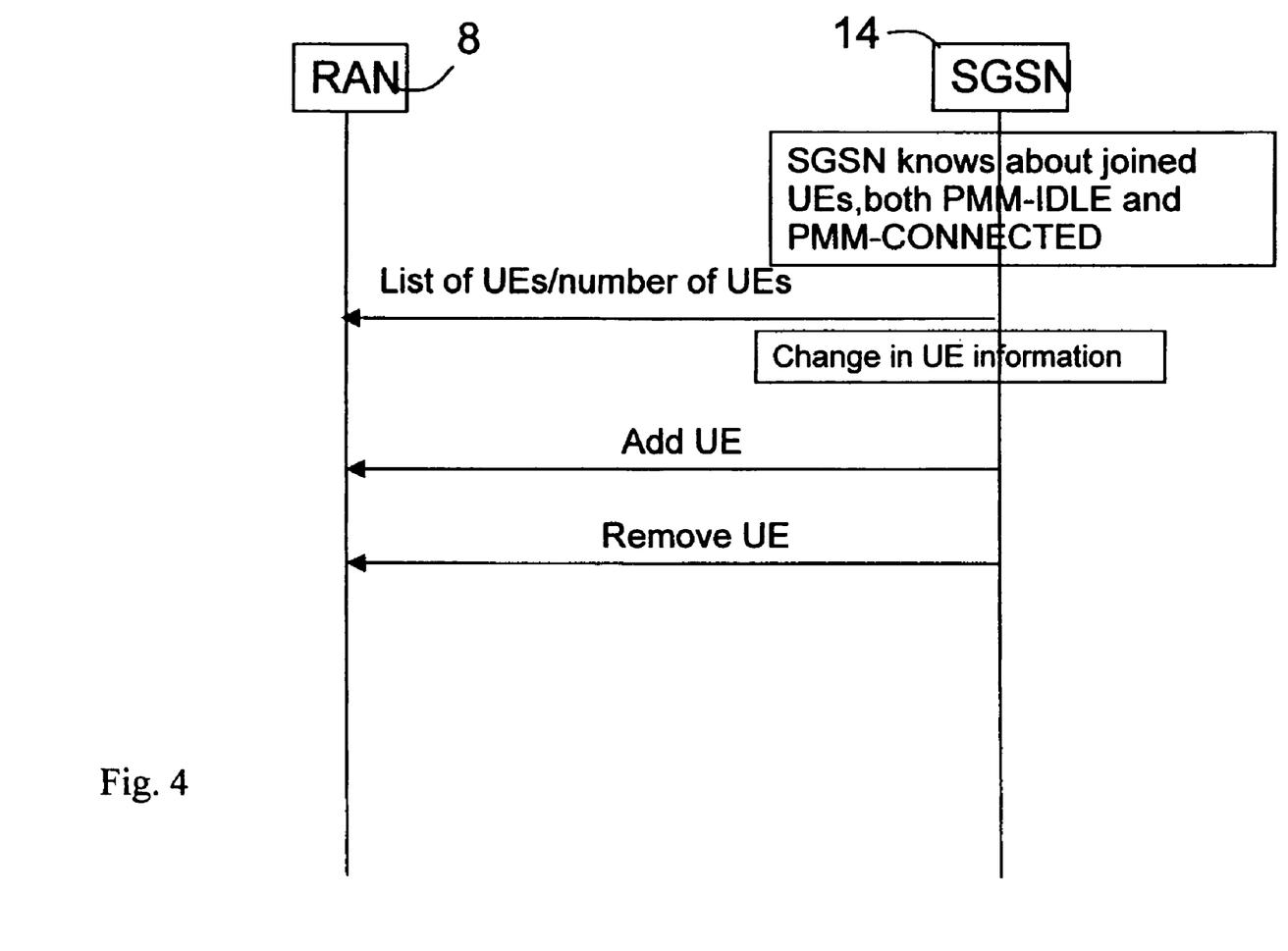
FIG. 4 is a signaling flowchart illustrating the operation of a further embodiment of the present invention.

The following will describe, with reference to FIG. 4, a procedure for informing the RAN 8 about the joined user equipment and/or any other changes in the status of user equipment that have already joined the service context.

In some service applications the RNC 7 needs be made aware of the user equipment that have joined an MBMS service. This information may be required for example for triggering the user related procedures in the RNC. For example, the current assumption in the 3GPP is that the RNC can decide whether it uses point-to-point or point-to-multipoint radio channels depending upon on the number of UEs receiving the MBMS data. If the number of UEs is below a threshold value, point-to-point radio channels are used. If the number of UEs is above the threshold value, point-to-multipoint radio channels are used. The SGSN may provide this information by means of a list of user equipment identities.

The identity information may be provided e.g. based on the IMSI (International Mobile Subscriber Identity); IMEI (International Mobile Equipment Identity); PTMSI (Packet Temporary Mobile Subscriber Identity); Iu connection ID; or SIM (Subscriber Identity Module).

Instead of information regarding UE identities (the identity information is not necessarily always needed in the radio access network), the SGSN may send only information regarding the number of PMM-CONNECTED UEs to the RNC.

The list sent to the RNC lists at least the user equipment that are in the PMM-CONNECTED state. The SGSN 14 may also send a corresponding list listing user equipment in the PMM-IDLE state to the RNC 7. A list may also list all user equipment regardless the Mobility Management (MM) state, i.e. include information of both PMM-CONNECTED and PMM-IDLE user equipment. Alternatively, information regarding the number of PMM-IDLE and/or PMM-CONNECTED user equipment is sent to the RNC. Thus the RNC may be provided with a list of connected mode UEs and/or a list of idle mode UEs.

A list of user equipment (UEs) may be sent in a RANAP signaling message. The Radio Access Network Application Part (RANAP) refers to a signaling protocol that consists of mechanisms that can be used for handling various procedures between the core network and radio access network. The RANAP can be used as the access network protocol for signaling over an interface between two control entities of the network. The RANAP is specified in detail in the 3GPP specification No. TS 25.413.

By means of combined RANAP messages for sending information regarding a number of user equipment it is possible to reduce the number of signaling messages and processing of signaling messages.

It is also possible to add a list of user equipment to the signaling messages that are conventionally used for other purposes, such as for MBMS radio access bearer (RAB) creation. For example, the SGSN 14 may send a MBMS RAB Assignment Request including a list of user equipment to the RNC 7.

It is possible that changes happen after the list of UEs has been sent from the core network entity to the radio access network entity. For example, a new PMM-CONNECTED and/or PMM-IDLE user equipment may appear for the MBMS service, or the Mobility Management (MM) state of an existing UE may change from PMM-IDLE to PMM-CONNECTED or vice versa. This procedure can be used to inform the RNC about new PMM-CONNECTED and/or PMM-IDLE user equipment. This is shown in FIG. 4 below the step box "Change in UE information".

The first of the shown two update message is 'Add UE' message. The 'Add UE' may include one or more UE identities. It is also possible that one or more UEs may have to be removed from the list. These user equipment may be either in the PMM-CONNECTED or PMM-IDLE mode. This is shown as a 'Remove UE' message, which, again, may include one or more appropriate user equipment identities.

In the case of PMM-CONNECTED user equipment, the SGSN may also notice changes in the Iu connection endpoint. The SGSN may become aware that the Iu connection is removed between the SGSN and the old RNC and is established between the SGSN and the new RNC. This knowledge may then be used as a trigger for the above mentioned 'Add UE' and 'Remove UE' procedures.

At least two or all of the above described procedures can be combined into one RANAP procedure. In other words, one RANAP message may be used for 1) providing a list of UEs from the SGSN to the RNC, 2) for adding UEs and 3) for removing UEs. The RANAP message may also include information about the way the RNC is required to behave. More particularly, the SGSN may inform the RNC what the RNC should do with the list (initial list, add UEs to the list, remove UEs from the list). These procedures are for modifying the list of UEs that RNC already has.

It should be noted that 'RANAP Ack' messages may need to be sent in the above referenced cases. However, this is an implementation issue and not an essential requirement for the operation in accordance with the present invention.

According to a further embodiment corresponding procedure can be used for transporting lists of user equipment between radio network controllers. This may be needed e.g. when the controlling radio network controller (CRNC) and the serving radio network controller (SRNC) are provided by different radio network controller (RNC) entities. The controller may be different, for example, in instances wherein multicast/broadcast multimedia service (MBMS) controlling radio network controller (CRNC) service context establishment is provided as a separate procedure with respect to the establishment of the user equipment (UE) specific multicast/broadcast multimedia service (MBMS) context. Therefore, since they are separated, they can be initiated upon different time, and the serving radio network controller may have changed.

The initiator is in both cases the serving GPRS support node (SGSN). When the contexts are established separately, it is the responsibility of the serving radio network controller (SRNC) to check the list (e.g. "joined user equipment" or "removed user equipment" or "user equipment status") which is received from the serving GPRS support node (SGSN), and to find out the location of the listed user equipment in the network. If such user equipment (UE) are found which are under a cell controlled by another controlling radio network controller (CRNC), the serving radio network controller (SRNC) is responsible of informing the controlling radio network controller (CRNC) about the user equipment (UE) in connected and/or idle mode. This is performed by sending a list of active or inactive user equipment (UE) over the Iur-interface, wherein the number of joined user equipment (UE) and/or a list of user equipment identities and the MBSM service in question is indicated. Based on this message, the controlling radio network controller (CRNC) can also take into account these user equipment (UE) when the selection of the channel type is made. As response message, the controlling radio network controller (CRNC) can give information about e.g. the selected parameters and the selected channel type to the serving radio network controller (SRNC), in order to help the serving radio network controller (SRNC) in informing the user equipment (UE) about the multicast/broadcast multimedia service (MBMS).

It should be appreciated that whilst embodiments of the present invention have been described in relation to mobile stations, embodiments of the present invention are applicable to any other suitable type of user equipment.

It should be appreciated that while the embodiments of the invention are described in the context of a UMTS (Universal Mobile Telecommunications System) and a GPRS (General Packet radio Service) and Internet Protocol (IP) networks, the embodiments of the present invention are applicable to any network, independent of transport layer technology, and independent of the architecture (connection-oriented or connectionless) of the system. Thus the invention is also applicable to, in addition of the code division multiple access (CDMA) any other access techniques including frequency division multiple access (FDMA), time division multiple access (TDMA) and space division multiple access (SDMA) as well as any hybrids thereof. For example, MBMS may also be provided in connection with 2G networks such as the GSM. In this case, the RAN nodes would be called different names. For example, the RNC is referred to as the Base Station controller (BSC). The interface between the RAN and CN is called Gb instead of Iu.

The embodiment of the invention has discussed the interface between the nodes belonging to the radio access network and the core network. Embodiments of the present invention can be applicable to other network elements where applicable.

It is also noted herein that while the above describes exemplifying embodiments of the invention, there are several variations and modifications which may be made to the disclosed solution without departing from the scope of the present invention as defined in the appended claims.

What is claimed is:

1. A method, comprising:
   collecting, at a core network entity, information regarding user equipment joining a service context, wherein the core network entity is in a core network of a communication system, the communication system comprising at least one access network wherein a plurality of user equipment is configured to join a service context;
   sending, from the core network entity to an access network entity, a message containing information regarding a plurality of user equipment that has joined the service context;

removing information associated with at least one of the user equipment or the service context from the network entity after a predefined period of inactive use of the service; and informing the access network entity of the removal.

2. The method of claim 1, wherein the sending said information regarding the plurality of user equipment that has joined the service comprises sending the information in a radio access network application part message.

3. The method of claim 1, further comprising:

storing said information regarding the plurality of user equipment that has joined the service in a core network entity that comprises at least one of a serving general packet radio network support node or a gateway general packet radio service support node, wherein the sending the message comprises sending the message from the core network entity.

4. The method of claim 1, further comprising:

sending a further message from the core network entity for updating information stored in an access network entity regarding the plurality of user equipment that has joined the service context.

5. The method of claim 4, further comprising:

updating an addition or a removal of a user equipment from the service context.

6. The method of claim 1, further comprising:

sending the message containing information regarding the plurality of user equipment that has joined the service context from the access network entity to another access network entity via the core network entity.

7. The method of claim 1, further comprising:

associating the service context with a multimedia broadcast/multicast service.

8. The method of claim 1, further comprising:

relating the information contained in the message to the mobility management state of the user equipment.

9. A method, comprising:

configuring a plurality of user equipment in a communication system to join a service context of a service;

storing, in a memory of at least one network entity, information regarding user equipment that has joined a service context;

removing from the memory information associated with the user equipment or the service context after a predefined period of inactive use of a service; and providing the service context comprising multicast/broadcast multimedia service context.

10. The method of claim 9, further comprising:

starting a timer in response to a detection of said inactive use and removing information from the memory in response to an expiration of a timer.

11. The method of claim 9, further comprising:

marking information by an inactive indicator for removal after the predefined period.

12. The method of claim 9, further comprising:

providing the inactive use including inactivity by a user equipment; and including within the information to be removed information regarding the user equipment context of said user equipment stored in the memory.

13. The method of claim 9, further comprising:

providing the inactive use including overall inactivity in the use of the service; and including within the information to be removed information regarding the service context stored in the memory.

14. The method of claim 9, further comprising:

providing a detection of inactive use of the service in a network entity of a communication system.

15. A communication system, comprising:

a core network and at least one access network wherein a plurality of user equipment is configured to join a service context;

a collector configured to collect, at a core network entity, information regarding user equipment joining a service context;

a sending unit configured to send, from the core network entity to an access network entity, a message containing information regarding a plurality of user equipment that has joined a service context;

a removing unit configured to remove information associated with at least one of the user equipment or the service context from the network entity after a predefined period of inactive use of the service; and an informing unit configured to inform the access network entity of the removal.

16. A communication system, comprising:

collecting means for collecting, at a core network entity, information regarding user equipment joining a service context;

sending means for sending, from the core network entity to an access network entity, a message containing information regarding a plurality of user equipment that has joined a service context;

removing means for removing information associated with at least one of the user equipment or the service context from the network entity after a predefined period of inactive use of the service; and informing means for informing the access network entity of the removal.

* * * * *